United States Patent
Hu et al.

(10) Patent No.: US 12,528,770 B2
(45) Date of Patent: Jan. 20, 2026

(54) PROCESS FOR THE PRODUCTION OF LEVETIRACETAM AND INTERMEDIATES THEREOF

(71) Applicant: Suzhou BrightHope Pharmatech Co., Ltd, Jiangsu Province (CN)

(72) Inventors: Songzhou Hu, Princeton, NJ (US); Lijun Deng, Hubei (CN); Wen Yu, Hubei (CN); Zhen Song, Shanghai (CN)

(73) Assignee: SUZHOU BRIGHTHOPE PHARMATECH CO., LTD., Jiangsu Province (CN)

( * ) Notice: Subject to any disclaimer, the term of this patent is extended or adjusted under 35 U.S.C. 154(b) by 414 days.

(21) Appl. No.: 18/208,633

(22) Filed: Jun. 12, 2023

(65) Prior Publication Data

US 2024/0409511 A1    Dec. 12, 2024

(51) Int. Cl.
*C07D 207/27*    (2006.01)

(52) U.S. Cl.
CPC .................. *C07D 207/27* (2013.01)

(58) Field of Classification Search
CPC .................................... C07D 207/27
See application file for complete search history.

(56) References Cited

U.S. PATENT DOCUMENTS

| | | |
|---|---|---|
| 4,696,942 A | 9/1987 | Gobert et al. |
| 4,696,943 A | 9/1987 | Gobert et al. |
| 4,837,223 A | 6/1989 | Gobert et al. |
| 4,943,639 A | 7/1990 | Gobert et al. |
| 6,107,492 A | 8/2000 | Futagawa et al. |
| 6,124,473 A | 9/2000 | Cavoy et al. |
| 6,686,477 B2 | 2/2004 | Boaz |
| 6,713,635 B2 | 3/2004 | Surtees et al. |
| 7,122,682 B2 | 10/2006 | Ates et al. |
| 7,563,912 B2 | 7/2009 | Ates et al. |
| 7,902,380 B2 | 3/2011 | Li et al. |
| 7,939,676 B2 | 5/2011 | Colli et al. |
| 8,492,416 B2 | 7/2013 | Kenda et al. |
| 11,085,059 B2 | 8/2021 | Xiao et al. |
| 11,384,050 B1 | 7/2022 | Hu |
| 11,498,897 B2 | 11/2022 | Chen et al. |
| 2004/0259933 A1 | 12/2004 | Dolitzky et al. |
| 2006/0258734 A1 | 11/2006 | Ates et al. |
| 2008/0194840 A1 | 8/2008 | Mandal et al. |
| 2009/0069575 A1 | 3/2009 | Li et al. |
| 2010/0076204 A1 | 3/2010 | Forcato et al. |
| 2020/0172479 A1 | 6/2020 | Chen et al. |
| 2022/0162165 A1 | 5/2022 | Liu et al. |
| 2022/0242819 A1 | 8/2022 | Hu |
| 2022/0324801 A1 | 10/2022 | Hu |

FOREIGN PATENT DOCUMENTS

| | | |
|---|---|---|
| CN | 101885696 A | 11/2010 |
| CN | 101333180 B | 5/2011 |
| CN | 101748087 B | 11/2011 |
| CN | 102558012 A | 7/2012 |
| CN | 102994429 B | 5/2014 |
| CN | 103922988 A | 7/2014 |
| CN | 106187851 A | 12/2016 |
| CN | 106432032 A | 2/2017 |
| CN | 107915667 A | 4/2018 |
| CN | 106591179 B | 7/2018 |
| CN | 108329247 A | 7/2018 |
| CN | 108409592 A | 8/2018 |
| CN | 108440364 A | 8/2018 |
| CN | 108707099 A | 10/2018 |
| CN | 108821992 A | 11/2018 |
| CN | 109053528 A | 12/2018 |
| CN | 109134308 A | 1/2019 |
| CN | 109134341 A | 1/2019 |
| CN | 109943618 A | 6/2019 |
| CN | 110003074 A | 7/2019 |
| CN | 110028434 A | 7/2019 |
| CN | 110590635 A | 12/2019 |
| CN | 110698379 A | 1/2020 |
| CN | 111004138 A | 4/2020 |
| CN | 113861090 A | 12/2021 |
| CN | 114702426 A | 7/2022 |
| CN | 115260075 A | 11/2022 |
| GB | 1309692 A | 3/1973 |
| WO | 2004083180 A1 | 9/2004 |
| WO | 2005023763 A1 | 3/2005 |
| WO | 2007080470 A1 | 7/2007 |
| WO | 2008012268 A1 | 1/2008 |
| WO | 2009057137 A1 | 5/2009 |
| WO | 2019028666 A1 | 2/2019 |
| WO | 2019028669 A1 | 2/2019 |
| WO | 2019028671 A1 | 2/2019 |
| WO | 2019029598 A1 | 2/2019 |
| WO | 2020216146 A1 | 10/2020 |
| WO | 2022001649 A1 | 1/2022 |
| WO | 2022169747 A1 | 8/2022 |

OTHER PUBLICATIONS

International Search Report with written opinion issued by the International Searching Authority for International Patent Application No. PCT/US 24/28009, mailed on Jul. 26, 2024.

*Primary Examiner* — Kamal A Saeed
(74) *Attorney, Agent, or Firm* — Myers Wolin, LLC

(57) ABSTRACT

There is disclosed an improved process for the racemization of (R)-α-ethyl-2-oxo-1-pyrrolidineacetic acid in a solution of alkali hydroxide. The process comprises heating a crystalline suspension of the racemic (RS)-α-ethyl-2-oxo-1-pyrrolidineacetic acid at a temperature from 100° C. to 250° C. to increase the yield and purity. The racemic (RS)-α-ethyl-2-oxo-1-pyrrolidineacetic acid is optically resolved into (S)-α-ethyl-2-oxo-1-pyrrolidineacetic acid and converted to levetiracetam.

10 Claims, No Drawings

PROCESS FOR THE PRODUCTION OF LEVETIRACETAM AND INTERMEDIATES THEREOF

FIELD OF THE INVENTION

This invention relates to a process for the production of levetiracetam, more particularly, it relates to an improved process for the racemization of (R)-α-ethyl-2-oxo-1-pyrrolidineacetic acid in the production of levetiracetam.

BACKGROUND OF THE INVENTION

Levetiracetam is the S-enantiomer of etiracetam in a class of medications called anticonvulsants. It is used in combination with other medications to treat certain type of seizures in adults and children with epilepsy. Levetiracetam is chemically (S)-α-ethyl-2-oxo-1-pyrrolidineacetamide and has the following structure:

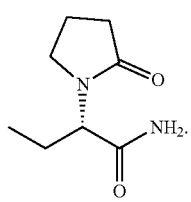

(I)

Although numerous methods have been developed for preparing levetiracetam, it is commercially produced by one of the two methods first disclosed in GB 1309692 and U.S. Pat. No. 4,696,943. In the first method, 2-pyrrolidinone and alkyl 2-halobutyrate are used as the starting materials in a process according to the following reaction scheme:

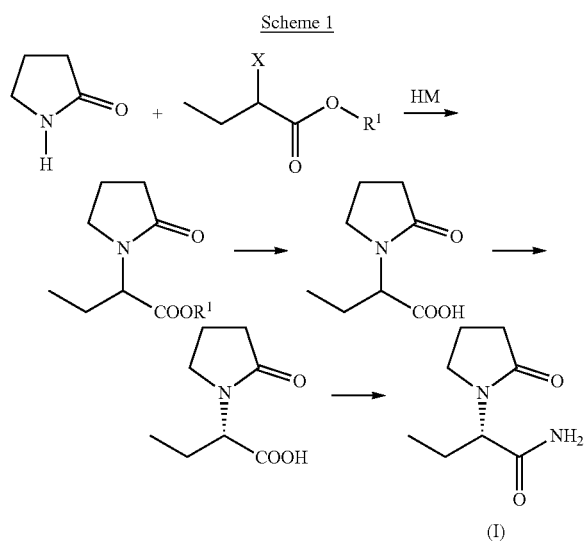

Scheme 1 wherein X is halogen, HM is metal hydride, and $R^1$ is an alkyl group.

In the second method, L-2-aminobutanamide hydrochloride and alkyl 4-halobutyrate or 4-halobutyryl halide are used as the starting materials in a process according to the following reaction scheme:

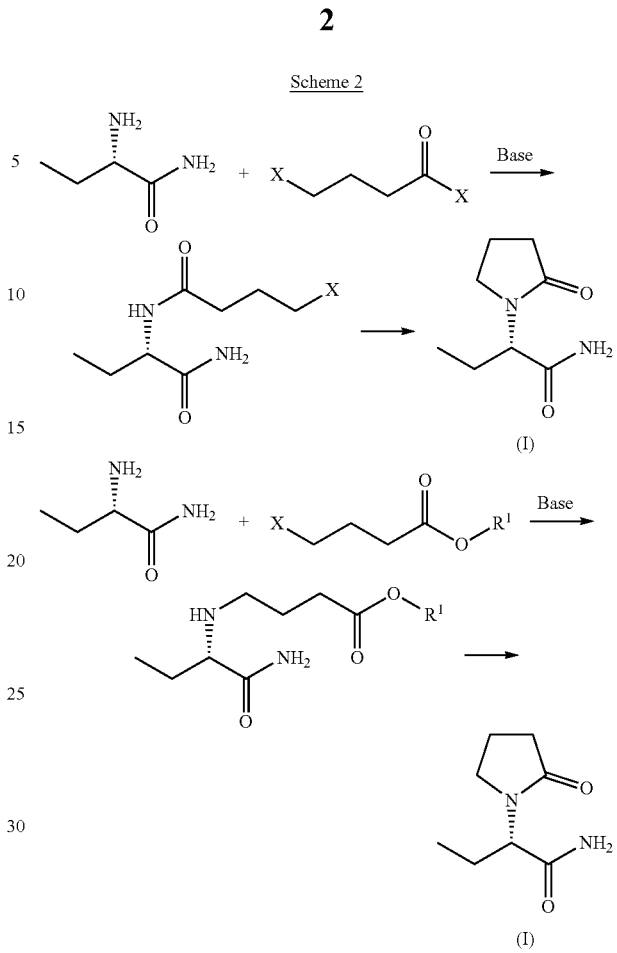

Scheme 2 wherein X is halogen, $R^1$ is an alkyl group, and the base is an organic or inorganic base such as triethylamine or sodium carbonate.

There are inherent disadvantages in these two methods for the production of levetiracetam. In the process according to the first method, the metal hydride, which is required to deprotonate 2-pyrrolidinone, is dangerous to handle on a large scale and presents serious safety issues for the manufacturing plant. In addition, the alkyl 2-halobutyrate ester is not only unavailable commercially but also extremely obnoxious, posing environmental and occupational problems.

In the process according to the second method, just like the alkyl 2-halobutyate in the process of the first method, alkyl 4-halobutyrate and 4-halobutyryl halide are also extremely obnoxious, posing the same environmental and occupational problems. In addition, L-2-aminobutanamide hydrochloride is specifically produced for levetiracetam and as a result is costly. L-2-aminobutanamide hydrochloride is produced either from racemic 2-aminobutanamide by optical resolution or from L-2-aminobutyric acid, which is not one of the naturally occurring L-amino acids, but specifically produced for the purpose. Although there have been intensive efforts to improve the process for producing L-2-aminobutanamide hydrochloride and L-2-aminobutyric acid, they are still costly. In addition, during the cyclization under strongly basic condition, the product of levetiracetam is partially racemized or hydrolyzed.

U.S. Pat. No. 11,384,050 discloses an efficient process for the production of levetiracetam that has ameliorated much disadvantages of known processes. The process according this process can construct a necessary structure of a key intermediate of formula (II):

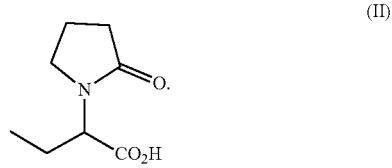

from readily available starting materials without isolating any intermediate.

In order to produce levetiracetam, it is necessary to resolve the racemic acid of formula (II) into the (S)-acid of formula (III) and the (R)-acid of formula (IV):

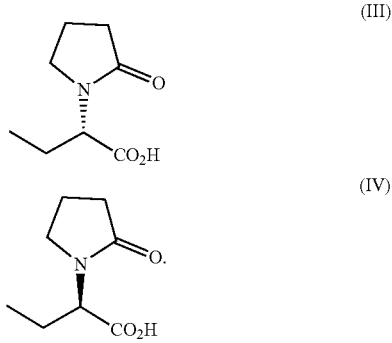

The (S)-acid of formula (III) can be readily converted to levetiracetam, while the (R)-acid of formula (IV) is a byproduct of the process. In order to improve the process economy and efficiency, it is essential to racemize the (R)-acid of formula (IV) to the racemic acid of formula (II).

U.S. Pat. No. 4,696,943 discloses a method for the resolution of the racemic acid of formula (II) by using an equimolar molar amount of R-(+)-1-phenylethylamine and triethylamine in benzene to obtain the (S)-acid of formula (III), which is subsequently converted to levetiracetam. There are disadvantages for the process. First, the use of benzene in the production of a pharmaceutical product is not desirable. Second, racemization and recycling of the (R)-acid of formula (IV) was not reported. To improve the efficiency and economy of the process, it is imperative to racemize and recycle the (R)-acid of formula (IV).

U.S. Pat. No. 7,902,380 improves the method of U.S. Pat. No. 4,696,943 by performing the resolution in toluene by using a mixture of R-(+)-1-phenylethylamine and triethylamine and discloses a method for the racemization of the (R)-acid of formula (IV). The racemization was carried out in toluene in the presence of large excess of acetic hydride.

CN 101333180B discloses a further improved method for the resolution of racemic acid of formula (II) by performing the resolution in ketone and ester solvent and by using a mixture of R-(+)-1-phenylethylamine and triethylamine. It also discloses a method for the racemization of (R)-acid of formula (IV) in 30% sodium hydroxide under refluxing condition. The racemic acid was recovered in a yield of 70%.

CN 110003074A and the corresponding US 20220162165A1 improve the method of racemization of CN 101333180B by heating a solution of the (R)-acid in concentrated sodium hydroxide at a temperature from 80° C. to 95° C. for 8-10 hours, followed by partial neutralization to pH 7-8, then treatment with activated charcoal to remove black impurities.

CN 114702426A discloses a method for the racemization of the (R)-acid in concentrated sodium hydroxide at a temperature from 60-80° C. and a method for the separation of unknown impurities formed during the racemization by adding an acid at different temperature.

There are disadvantages in these processes for the racemization and reuse of the (R)-acid after the resolution. First, the use of excess amount of acetic anhydride in the racemization is not economical. Second, racemization of the (R)-acid of formula (IV) in concentrated sodium hydroxide results in the formation of byproduct and the yield has much to improve.

It is an object of the present invention to overcome these disadvantages. It is another object of the present invention to disclose an improved process for the racemization of the (R)-acid of formula (IV) to the racemic acid of formula (II) and its use for the production of levetiracetam.

SUMMARY OF THE INVENTION

The present invention discloses a process for the production of levetiracetam, more specifically, it relates to an improved process for the racemization of the (R)-acid of formula (IV) to the racemic acid of formula (II) for the production of levetiracetam. The invention was accomplished by a heat treatment of the racemic acid of formula (II) after the racemization in an alkali hydroxide solution comprising the (R)-acid of formula (IV).

DETAILED DESCRIPTION OF THE INVENTION

The present invention discloses an improved process for the production of the racemic (RS)-acid of formula (II) through racemization of the (R)-acid of formula (IV):

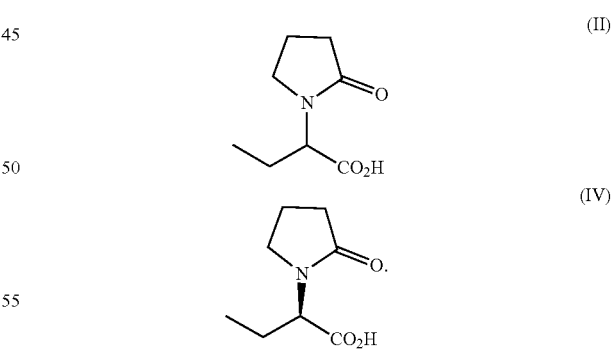

The racemic acid of formula (II) is then optically resolved and converted to levetiracetam.

The invention was accomplished by a surprising and unexpected discovery that the yield and purity of the racemic acid of formula (II) can be significantly increased by subjecting a crystalline suspension of the racemic acid of formula (II) to a heat treatment after the (R)-acid of formula (IV) is racemized in a solution of alkali hydroxide. The alkali is lithium, sodium, potassium, or a mixture thereof.

The process according to the present invention starts with heating an alkali hydroxide solution comprising the (R)-acid of formula (IV). The (R)-acid of formula (IV) can be from any source or any process. Preferably, it is obtained as a byproduct from an optical resolution of the racemic acid of formula (II) to produce the (S)-acid of formula (III). There is no limit as to the optical purity of the (R)-acid, from 1% in enantiomeric excess to optically pure 100% in enantiomeric excess. Preferably, the optical purity of the (R)-acid is as obtained in an optical resolution process without further purification.

The molar ratio of alkali hydroxide to (R)-acid is from 0.5:1 to 10:1, preferably from 0.8:1 to 0.8:2, most preferably from 1.2:1 to 1.5:1. If the molar ratio of alkali hydroxide to the (R)-acid is less than 1:1, the racemization is slow. If the molar ratio of alkali hydroxide to the (R)-acid is more than 1.5:1, excess decomposition of the racemic acid of formula (II) was observed.

The racemization can be carried out at a temperature from 80° C. to 250° C. under normal, autogenous, or increased pressure. The racemization can be conveniently monitored by measuring the optical rotation of the reaction solution. The racemization is deemed to be complete when the optical rotation becomes zero. It has been found that the temperature for the racemization to complete depends on the concentration of alkali hydroxide. When the concentration of alkali hydroxide is more than 10%, racemization can occur at a temperature from 90° C. to refluxing temperature. But if the concentration of alkali hydroxide is less than 5%, much higher temperature at 180° C. is required to complete the racemization.

After the racemization is complete, the strongly basic solution is converted to acidic by adding an acid to form a crystalline suspension of the racemic acid of formula (II). A suitable acid is selected from the group consisting of sulfuric acid, hydrochloric acid, hydrobromic acid, nitric acid, phosphoric acid, formic acid, acetic acid, propionic acid, glycolic acid, lactic acid, malic acid, tartaric acid, citric acid, oxalic acid, fumaric acid, maleic acid, alkyl sulfonic acid, aryl sulfonic acid, and a mixture thereof. Preferably, the acid is sulfuric acid.

In addition, the strongly basic solution of racemization reaction can be partially acidified by adding a diacid of formula (V):

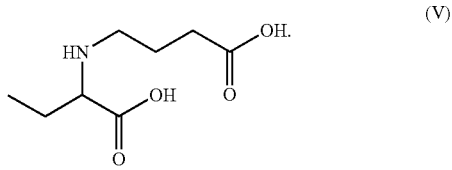

(V)

A crude product of the racemic acid of formula (II) can be obtained by a solid-liquid separation of the crystalline suspension. However, it is found that this crude product is not pure and contains significant amounts of impurities. The chemical purity of the racemic acid of formula (II) is found to vary from 85% to 95%. The yield of the racemic acid after the racemization is also found to be less than 90%. In addition, this crude product is not suitable for optical resolution, because it contains significant amounts of insoluble materials in solvents used for the optical resolution, for example, in toluene.

It has been surprising and unexpected to discover that the yield and purity of the racemic acid of formula (II) can be significantly increased if this crystalline suspension is subjected to a heat treatment by heating to a temperature from 100° C. to 250° C., preferably from 110° C. to 160° C., more preferably from 115° C. to 150° C., most preferably from 120° C. to 140° C. After the heat treatment, the racemic acid of formula (II) can be obtained in a molar yield of at least 90%, preferably at least 95%, more preferably nearly 100%, on the basis of the (R)-acid starting material. Furthermore, the purity of isolated racemic acid of formula (II) can be increased from not more than 95% to more than 97%, preferably, more than 98%, more preferably 99%, most preferably nearly 100%. The racemic acid obtained contains no insoluble material for the optical resolution.

On the other hand, the crystalline suspension can be separated to a solid racemic acid of formula (II) and a mother liquor solution. The mother liquor solution is then heated to obtain additional racemic acid of formula (II). The temperature for this heat treatment is from 100° C. to 250° C., preferably from 110° C. to 160° C., more preferably from 115° C. to 150° C., most preferably from 120° C. to 140° C. After the heat treatment to obtain additional racemic acid, the racemic acid of formula (II) can be obtained in a molar yield of at least 90%, preferably at least 95%, more preferably nearly 100%, on the basis of the (R)-acid of formula (IV) starting material.

It has been surprising and unexpected to discover that this impure solid racemic acid of formula (II) can be purified by suspending the solid racemic acid of formula (II) in water and subjecting the suspension to a heat treatment from 100° C. to 250° C., preferably from 110° C. to 160° C., more preferably from 115° C. to 150° C., most preferably from 120° C. to 140° C. After the heat treatment, the purity of the racemic acid can be increased to greater than 96%, preferably, greater than 97%, more preferably, greater than 98%, most preferably, greater than 99%.

It is even more surprising and unexpected to discover that impurities in the solid racemic acid are converted to the racemic acid of formula (II) during the heat treatment, thus increasing the yield of the racemic acid.

The racemic acid of formula (II) can be readily resolved into the (S)-acid of formula (III), which is then converted to levetiracetam of formula (I) by processes known to one skilled in the art.

The process according to the present invention can be carried out discontinuously, semi-continuously, or continuously.

EXAMPLES

The following examples will illustrate the practice of this invention but are not intended to limit its scope.

Example 1

To a flask were added 100 g of 30% sodium hydroxide and 100 g of (R)-acid of formula (IV) (85% optical purity). After the solution was refluxed for 6 hours, the (R)-acid was deemed to be racemized as the optical rotation became nearly zero, when 1 g of the solution was diluted to 50 mL with water. To the stirred solution were added 150 mL of water and 37 g of sulfuric acid to form a crystalline suspension. The suspension was then transferred to an autoclave and heated to 130° C. for 3 hours. After cooling to room temperature, the crystalline suspension was filtered and washed with 50 mL of water to yield 92 g of the racemic acid of formula (II). The purity is greater than 99%. $[\alpha]_D 25=0°$ (c=1, $H_2O$).

The mother liquor solution contained additional 4.5 g of the racemic acid of formula (II).

Example 2

To a flask was placed 355 g of an aqueous solution, prepared from 158 g of the (R)-acid and 150 g of 32% sodium hydroxide, wherein the (R)-acid had an optical purity of 90.3%. After the solution was refluxed at 105° C. for 6 hours, the (R)-acid was deemed to be racemized as the ratio of (R)-acid to(S)-acid in the solution became 50.08: 49.02. The total amount of (R)-acid and(S)-acid became 145.0 g.

To the solution was added 85 g of water and sulfuric acid to a pH of 3.0-3.5 to obtain a crystalline suspension. After being stirred at 35° C. for 0.5 hour, the suspension was filtered and washed with 100 g of water. The wet cake was dried at 80° C. to obtain 150 g of a white product. The product contained 143 g of the racemic acid in a purity of 95.3%. The ratio of (R)-acid to(S)-acid in the product was 50.03:49.07. The mother liquor solution contained additional 3.4 g of the racemic acid.

The mother liquor solution was placed in an autoclave and heated to 120° C. for 4 hours to obtain 8.1 g of racemic acid.

To an autoclave were added 146 g of the racemic acid of a purity of 95.3% and 540 mL of water. After the suspension was heated to 120° C. for 4 hours, the solution was cooled to 20° C. to crystallize the product, which was filtered and washed with 50 mL of water. The product weighted 119.4 g and had a purity of greater than 99%. The ratio of (R)-acid to(S)-acid in the product was 50.02:49.08. The mother liquor solution contained additional 21.0 g of the racemic acid.

It will be understood that the foregoing examples, explanation, and drawings are for illustrative purposes only and that in view of the instant disclosure various modifications of the present invention will be self-evident to those skilled in the art. Such modifications are to be included within the spirit and purview of this application and the scope of the appended claims.

What is claimed is:

1. A process for the production of(S)-α-ethyl-2-oxo-1-pyrrolidineacetamide of formula (I),

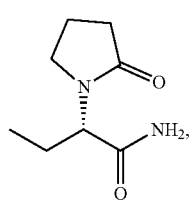

(I)

comprising:
(a) heating an alkali hydroxide solution comprising (R)-α-ethyl-2-oxo-1-pyrrolidineacetic acid of formula (IV) to form racemic (RS)-α-ethyl-2-oxo-1-pyrrolidineacetic acid of formula (II):

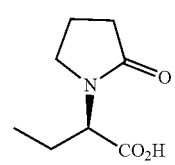

(IV)

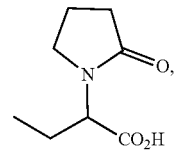

(II)

wherein the alkali is lithium, sodium, potassium, or a mixture thereof;
(b) adding an acid to the solution of step (a);
(c) subjecting the solution or the solid suspension of step (b) to a heat treatment;
(d) isolating the (RS)-α-ethyl-2-oxo-1-pyrrolidineacetic acid of formula (II) of step (c); and
(e) converting the (RS)-α-ethyl-2-oxo-1-pyrrolidineacetic acid of formula (II) of step (d) to (S)-α-ethyl-2-oxo-1-pyrrolidineacetamide of formula (I).

2. The process according to claim 1, wherein the heat treatment in step (c) is performed at a temperature from 100° C. to 250° C.

3. The process according to claim 1, wherein the acid is selected from the group consisting of sulfuric acid, hydrochloric acid, hydrobromic acid, nitric acid, phosphoric acid, formic acid, acetic acid, propionic acid, glycolic acid, lactic acid, malic acid, tartaric acid, citric acid, oxalic acid, fumaric acid, maleic acid, alkyl sulfonic acid, aryl sulfonic acid, and a mixture thereof.

4. The process according to claim 1, wherein the acid is added to the solution of step (a) to a pH from 2.0-6.0.

5. The process according to claim 1, wherein the molar yield of the racemic acid of formula (II) is at least 90% on the basis of the (R)-acid of formula (IV).

6. A process for the production of(S)-α-ethyl-2-oxo-1-pyrrolidineacetamide of formula (I),

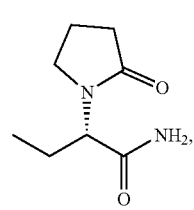

(I)

comprising:
(a) heating an alkali hydroxide solution comprising (R)-α-ethyl-2-oxo-1-pyrrolidineacetic acid of formula (IV) to form racemic (RS)-α-ethyl-2-oxo-1-pyrrolidineacetic acid of formula (II):

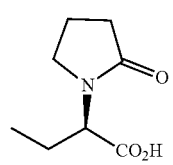

(IV)

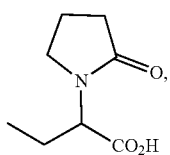

wherein the alkali is lithium, sodium, potassium, or a mixture thereof;

(b) adding an acid to the solution of step (a) to precipitate (RS)-α-ethyl-2-oxo-1-pyrrolidineacetic acid of formula (II);

(c) isolating the (RS)-α-ethyl-2-oxo-1-pyrrolidineacetic acid of formula (II) of step (b) to form a mother liquor solution;

(d) subjecting the mother liquor solution of step (c) to a heat treatment to form (RS)-α-ethyl-2-oxo-1-pyrrolidineacetic acid of formula (II);

(e) isolating the (RS)-α-ethyl-2-oxo-1-pyrrolidineacetic acid of formula (II) of step (d); and (f) converting the (RS)-α-ethyl-2-oxo-1-pyrrolidineacetic acid of formula (II) of step (c) and step (e) to (S)-α-ethyl-2-oxo-1-pyrrolidineacetamide of formula (I).

7. The process according to claim 6, wherein the heat treatment in step (c) is performed at a temperature from 100° C. to 250° C.

8. The process according to claim 6, wherein the acid is selected from the group consisting of sulfuric acid, hydrochloric acid, hydrobromic acid, nitric acid, phosphoric acid, formic acid, acetic acid, propionic acid, glycolic acid, lactic acid, malic acid, tartaric acid, citric acid, oxalic acid, fumaric acid, maleic acid, alkyl sulfonic acid, aryl sulfonic acid, and a mixture thereof.

9. The process according to claim 6, wherein the acid is added to the solution of step (a) to a pH from 2.0-6.0.

10. The process according to claim 6, wherein the molar yield of the racemic acid of formula (II) is at least 90% on the basis of the (R)-acid of formula (IV).

* * * * *